Feb. 28, 1933.  L. J. SCHULTZE  1,899,247
POWER TAKE-OFF DEVICE
Filed April 14, 1932  2 Sheets-Sheet 1
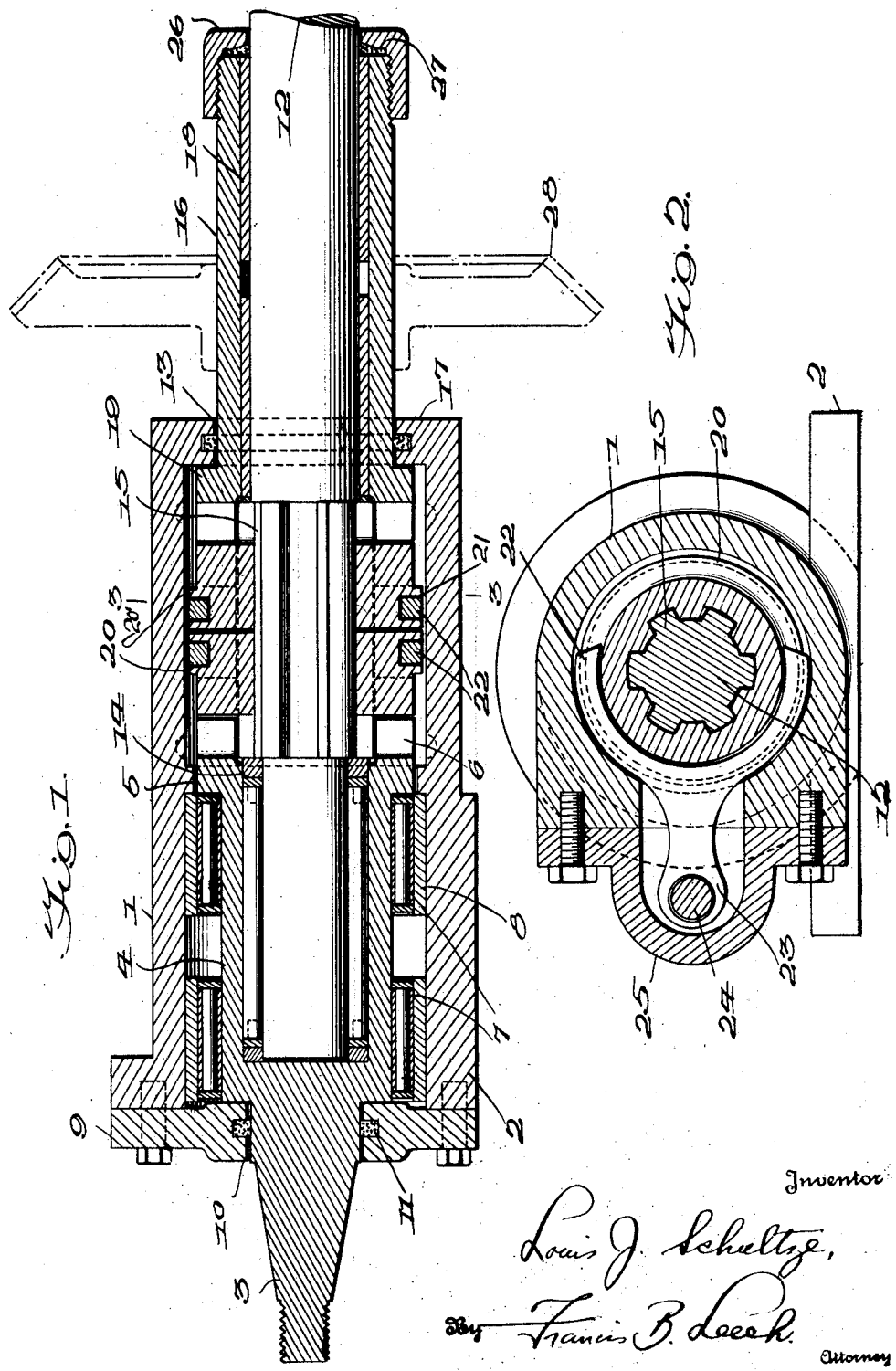
Inventor
Louis J. Schultze,
By Francis B. Leech.
Attorney

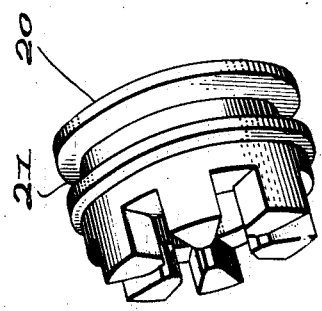
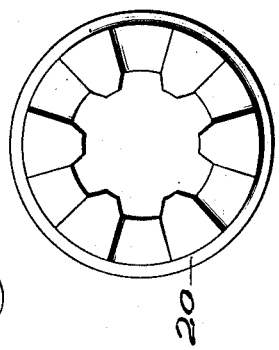
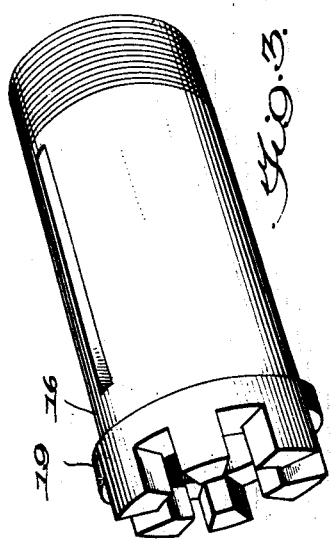
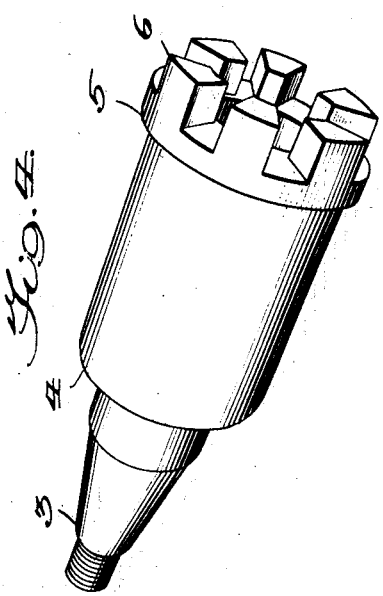

Patented Feb. 28, 1933

1,899,247

UNITED STATES PATENT OFFICE

LOUIS J. SCHULTZE, OF CHENOA, ILLINOIS

POWER TAKE-OFF DEVICE

Application filed April 14, 1932. Serial No. 605,295.

This invention relates to a power take-off device.

More particularly, the invention relates to a power take-off mechanism interposed in the drive of a motor vehicle, such as a truck or tractor, to provide means for driving external machinery such as concrete mixers, thrashers, saw mills, etc., either carried by the vehicle or external thereof.

An object of the invention is to provide a power take-off device utilizing the motive power of the vehicle, together with the conventional change speed device with which the vehicle is equipped so that the several forward speeds and reverse speed of the vehicle may be utilized for controlling the source of the external power.

Another object of the invention is to construct a simple, practical and rugged source of external power which may be readily installed on any existing self-propelled vehicle.

A still further object of the invention is to construct such a device so that there is provided not only a source of external power to drive ancillary mechanism but also to propel the vehicle, to which it is attached, simultaneously or selectively with the power take-off.

Referring to the drawings, Fig. 1 is a longitudinal cross-sectional view of the power take-off.

Fig. 2 is a vertical section taken on line 3—3 of Fig. 2.

Figs. 3, 4, 5 and 6 are detailed views of specific details of the device.

More specifically in the drawings, 1 denotes a substantially tubular casing in which is positioned the mechanism for accomplishing the objects outlined above. This casing 1 has formed thereon a base plate 2 which is attached to some convenient portion of the under-carriage of the vehicle to insure alignment of the power take-off mechanism.

In practice, a section of the drive shaft between the transmission and differential is removed and a device, which is the subject matter of this application, is positioned in the cut-out section. The driven shaft 12 from the engine, after passing through the selective change speed transmission, is inserted through an opening 13 in the end of the casing 1 and extends therein for a considerable length, being terminated adjacent the inner end of the bore of cylinder 4. The end of shaft 12 is longitudinally supported by anti-friction roller bearings 14 which are positioned concentric of the shaft 12 and interiorly of the cylinder 4.

The driven shaft 3, which is in the form of a stub shaft, is integrally machined on the end of the hollow cylinder 4. The opposite end of the cylinder 4 is provided with a radial flange 5 into which are machined longitudinal tapering gear teeth 6. This cylinder 4 is mounted interiorly of the tubular casing 1 and is anti-frictionally spaced for rotation therein by the roller bearings 7 mounted on bushings 8. The end of the cylinder 4 opposite the gear teeth 6 from which the stub shaft 3 projects, abuts the bolted cover plate 9 of the casing, the shaft portion 3 extending through opening 10 in the cover 9 and is sealed therein by washer 11 fitted in an annular recess formed in the opening to prevent leakage of lubricant.

Intermediate section 15 of driving shaft 12 is deeply splined and adjacent the splined portion is assembled the concentric cylindrical member 16, one end of which is retained against the wall 17 integrally formed in the end of the casing 1. The shaft 12 is anti-frictionally spaced from cylinder 16 by bushing 18 and the shaft and cylinder are sealed by cover 26 and packing 27.

The inner end of the cylinder 16 is formed with a radial flange 19 in which are machined gear teeth similar to flange 5 and gear teeth 6 of cylinder 4.

Slidably mounted on the splined section 15 of the shaft 12 are two movable collars 20 and 20' which in Fig. 1 of the drawings are shown in neutral or unengaged position. As will be clearly seen from the drawings, each of the collars 20 and 20' have a flat abutting face while their respective outer faces are toothed to form intermeshing gears for engagement with the gear teeth of flanges 5 and 19 of the cylinders previously described. Each collar 20 and 20' also has an annular groove 21 machined therein for retaining the yoke 22 of the operating fork 23. These forks 22 are attached to operating rods 24 carried in the bulged side cover plate 25 of the casing 1, see Fig. 2. In practice the operating rods may extend to the front and/or rear of the vehicle to provide convenient means for engaging and disengaging the power take-off. This detail of construction forms no essential part of the invention.

It will be obvious to those skilled in the art that, when the engine of the vehicle is operating and the transmission is in gear, rotation of driving shaft 12 is accomplished.

It follows that when the collars 20 and 20' are in the position shown in Fig. 1, driving shaft 12 merely revolves in the casing 1 and no torque or load is placed on driven shaft 3. However, when the fork 22 engaging the left-hand collar 20 is operated, it moves this collar to the left and the teeth 5 on the cylinder 4 and collar 20 mesh thus applying torque through the spline 15 and driven shaft 3 to rotate the drive wheels of the vehicle.

When the fork engaging right-hand collar 20' is operated, it moves this collar to the right and the gear teeth on the member 19 mesh with the teeth on the collar 20' to rotate the cylinder 16. The outer surface of cylinder 16 may then be used as a pulley to drive a belt, or a sprocket, or gear 28 may be attached to cylinder 16 to create a source of external power for a variety of purposes.

By the above described arrangement, it is possible to either drive the vehicle alone, as when the left-hand collar is in engagement, or to drive the source of external power when the right-hand collar is in engagement. Obviously when both collars are in engagement with their cooperating gear teeth, it is possible to not only drive the vehicle but also to simultaneously operate the power take-off, as for example, when agitating a batch of concrete which is being conveyed to its destination or while spraying fruit trees where the power take-off is connected to the spray pump.

What I claim is:

In a power take-off device, a casing, driving and driven shafts terminating in said casing, the driven shaft having radial teeth formed on its inner end, a spline on said driving shaft, abutting sliding gear collars having radial annular teeth on their non-abutting faces mounted on said spline, a concentric sleeve with annular radial teeth formed in its inner end retained in said casing and extending outwardly along a portion of said driving shaft, and operating means for moving said abutting gear collars to selectively engage the driving and driven shafts or the driven shaft and the concentric sleeve.

In testimony whereof I affix my signature.

LOUIS J. SCHULTZE.